(12) United States Patent
Weaver

(10) Patent No.: US 11,059,423 B1
(45) Date of Patent: Jul. 13, 2021

(54) EXTENDABLE BED FOR PICKUP TRUCK

(71) Applicant: Matthew N. Weaver, Saraland, AL (US)

(72) Inventor: Matthew N. Weaver, Saraland, AL (US)

(*) Notice: Subject to any disclaimer, the term of this patent is extended or adjusted under 35 U.S.C. 154(b) by 144 days.

(21) Appl. No.: 16/509,760

(22) Filed: Jul. 12, 2019

(51) Int. Cl.
*B60R 5/04* (2006.01)
*B60P 3/40* (2006.01)
*B62D 33/08* (2006.01)
*B62D 21/14* (2006.01)
*B62D 33/027* (2006.01)

(52) U.S. Cl.
CPC .............. *B60R 5/041* (2013.01); *B60P 3/40* (2013.01); *B62D 21/14* (2013.01); *B62D 33/027* (2013.01); *B62D 33/08* (2013.01)

(58) Field of Classification Search
CPC ........... B60R 5/041; B60P 3/40; B62D 21/14; B62D 33/027; B62D 3/08
See application file for complete search history.

(56) References Cited

U.S. PATENT DOCUMENTS

| 5,090,335 | A | 2/1992 | Russell | |
|---|---|---|---|---|
| 5,669,654 | A * | 9/1997 | Eilers | B60P 1/003 296/26.11 |
| 6,065,792 | A | 5/2000 | Sciullo et al. | |
| 6,491,331 | B1 | 12/2002 | Fox | |
| 8,328,263 | B1 | 12/2012 | Alexander et al. | |
| 10,077,083 | B1 * | 9/2018 | Survis | B62D 33/0273 |
| 10,239,567 | B1 * | 3/2019 | Parrish | B62D 33/08 |
| 2003/0141733 | A1 * | 7/2003 | Burg | B60R 5/041 296/26.09 |
| 2008/0217945 | A1 | 9/2008 | Barnes | |
| 2017/0246980 | A1 * | 8/2017 | Rodriguez, Jr. | B62D 33/08 |
| 2018/0134205 | A1 * | 5/2018 | Karumuri | B62D 33/0273 |

* cited by examiner

*Primary Examiner* — Lori L Lyjak
(74) *Attorney, Agent, or Firm* — George L Williamson

(57) ABSTRACT

Method and apparatus for a pickup truck having a bed which is adapted to be extendable. The extendable portion of the pickup truck bed is adapted to operate on rails or the like and to use an electric motor having a pump with fluid connections to hydraulic cylinders so that the hydraulic cylinders are attached to a portion of the extendable portion of the truck bed so that the truck bed extension can be operated from the cab of the pickup truck by the operator. The pickup bed extension is adapted to be easily moved from a retracted position to an extended position by the operator of the pickup truck.

13 Claims, 3 Drawing Sheets

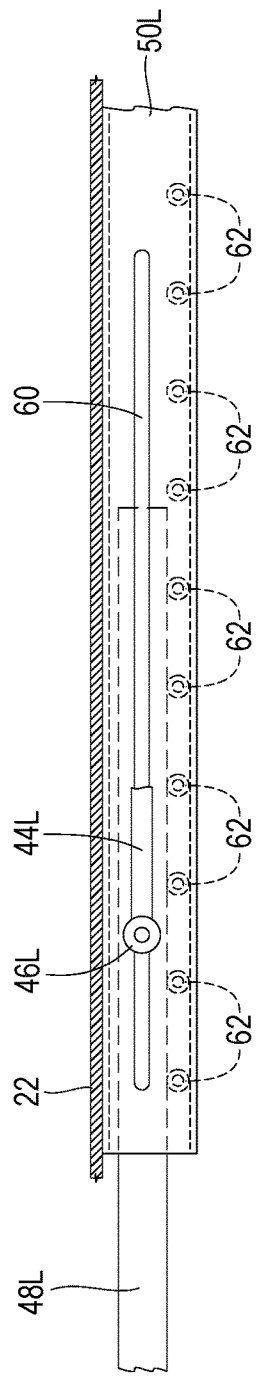
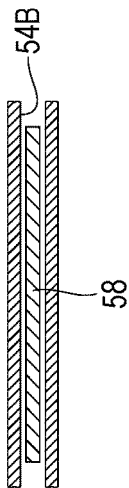
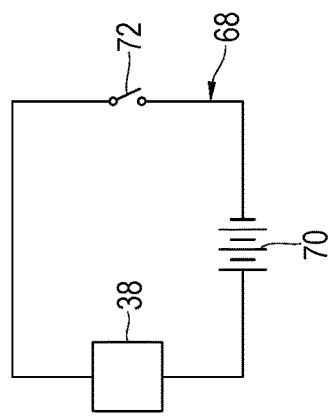
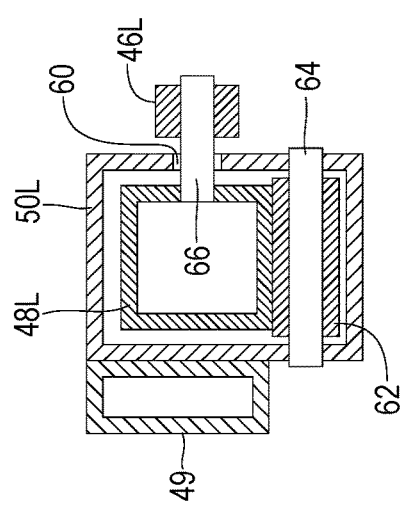
FIG. 5
FIG. 7
FIG. 8
FIG. 6
FIG. 9

EXTENDABLE BED FOR PICKUP TRUCK

BACKGROUND OF THE INVENTION

Field of the Invention

The present invention relates generally to pickup trucks, and more particularly, is concerned with an extendable bed for use with a pickup truck.

Description of the Related Art

Devices relevant to the present invention have been described in the related art; however, none of the related art devices disclose the unique features of the present invention.

In U.S. Pat. No. 8,328,263 dated Dec. 11, 2012, Alexander, et al., disclosed a bed extender. In U.S. Pat. No. 6,491,331 dated Dec. 10, 2002, Fox disclosed an extendable cargo deck for pickup trucks. In U.S. Pat. No. 5,090,335 dated Feb. 25, 1992, Russell disclosed a table for truck beds. In U.S. Pat. No. 6,065,792 dated May 23, 2000, Sciullo, et al., disclosed a slide-a bed system for a truck. In U.S. Patent Application Publication No. 2008/0217945 dated Sep. 11, 2008, Barnes disclosed an expandable truck bed.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a pickup truck having a bed which is adapted to be extendable. The extendable portion of the pickup truck bed is adapted to operate on rails or the like and to use an electric motor having a pump with fluid connections to hydraulic cylinders so that the hydraulic cylinders are attached to a portion of the extendable portion of the truck bed so that the truck bed extension can be operated from the cab of the pickup truck by the operator. The pickup bed extension is adapted to be easily moved from a retracted position to an extended position by the operator of the pickup truck.

An object of the present invention is to allow the bed of a pickup truck to be extended from a retracted position to an extended position to enlarge the cargo area. A further object of the present invention is to allow the bed of the truck to be easily extended by the operator of the truck. A further object of the present invention is to allow the bed of the pickup truck to be slidably extended by an electric motor operating a hydraulic cylinder connected to portions of the bed so that the hydraulic cylinders can move the bed from a retracted position to an extended position. A further object of the present invention is to allow the bed of a pickup truck to be easily operated by the driver of the pickup truck. A further object of the present invention is to provide an extendable pickup bed which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 5 is a side elevation view of the left sliding rail and fixed rail of the present invention.

FIG. 6 is a cross-sectional view taken from FIG. 5 of the present invention.

FIG. 7 is a cross-sectional view all a roller of the present invention.

FIG. 8 is a cross-sectional view of the bottom floor pocket of the present invention.

FIG. 9 is an electrical schematic of portions of the electrical system of the present invention.

LIST OF REFERENCE NUMERALS

Figure 1:
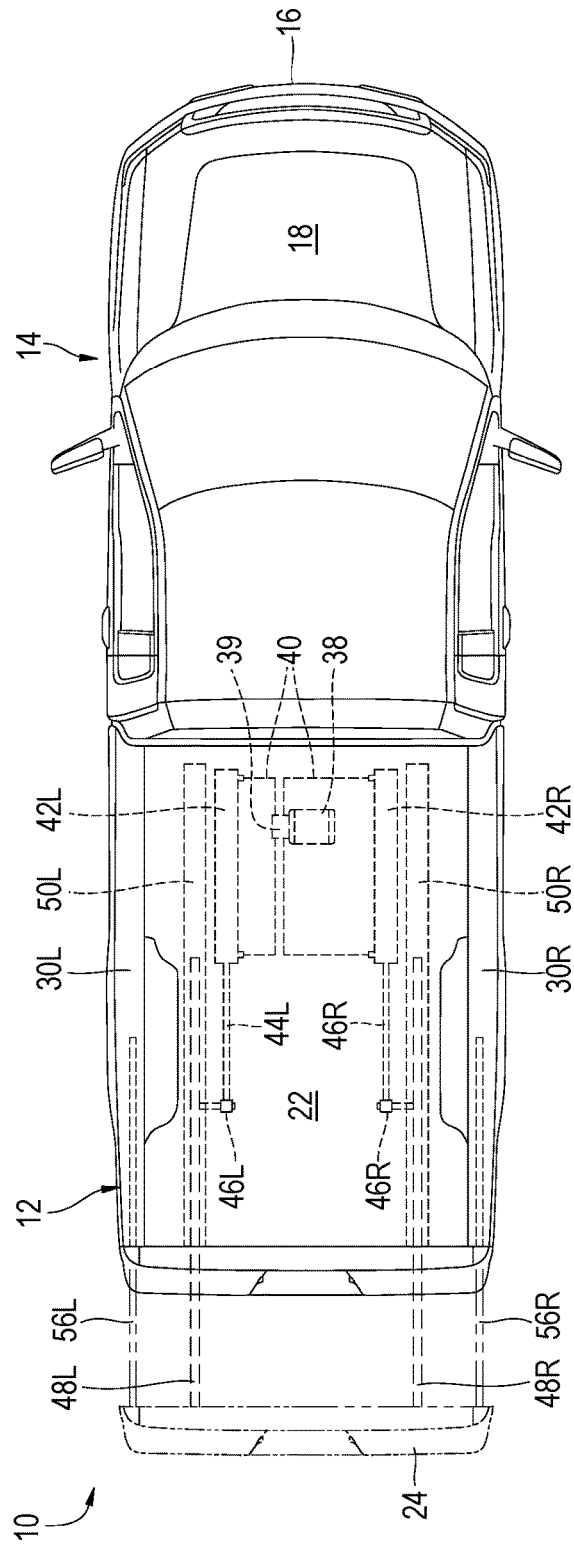
FIG. 1 is a plan view of the bed of the pickup truck in the extended position.

With regard to reference numerals used, the following numbering is used throughout the drawings.

10 present invention
12 bed of pickup truck
14 pickup truck
16 front end of pickup truck
18 engine compartment
20 cab of pickup truck
22 floor of pickup truck bed
24 tail gate
26 tail gate in upright position
28 tail gate in lowered position
30L left side panel of truck bed
30R right side panel of truck bed
32 operator
34 wheels
36L left tail light
36R right tail light
38 electric motor
39 hydraulic pump
40 hydraulic lines
42L left hydraulic cylinder
42R right hydraulic cylinder
43 piston
44L left extension rod
44R right extension rod
46L left connector
46R right connector
48L left sliding rail
48R right sliding rail
49 frame member
50L left fixed rail 50R right fixed rail
52 rear bumper
54 pocket of bed
54L left pocket
54R right pocket
54B bottom floor pocket
56L left side panel extension
56R right side panel extension
58 floor extension
60 slot
62 roller
64 axle
66 connecting link
68 electrical harness
70 battery
72 switch

DETAILED DESCRIPTION OF THE
PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein an extendable bed for a pickup truck is disclosed and which is generally indicated by reference number 10.

Figure 2:
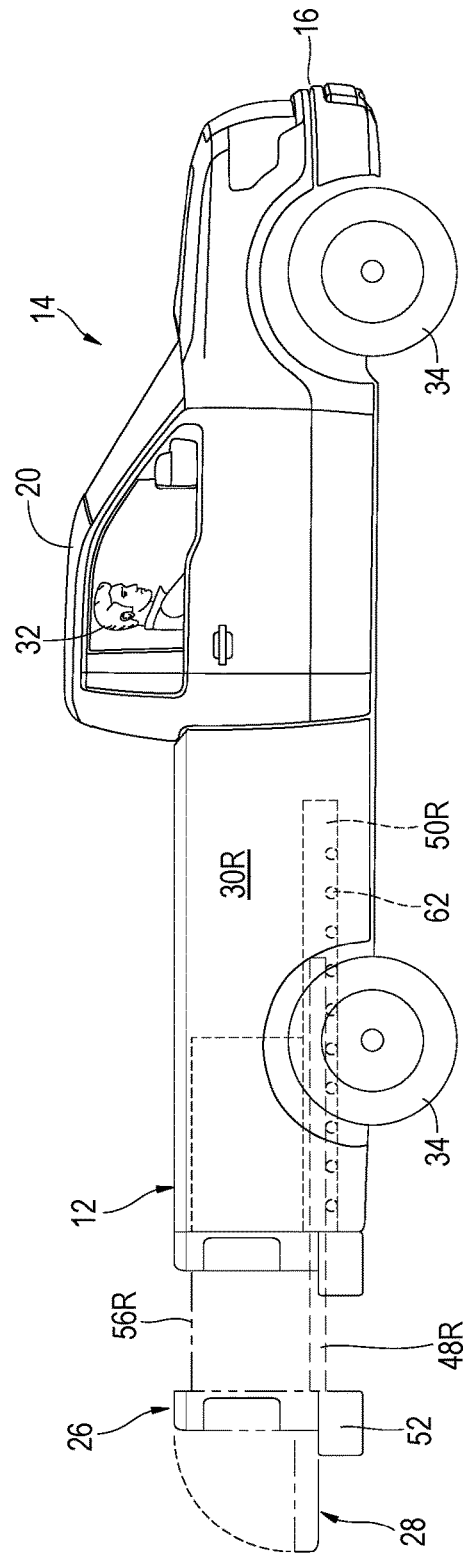
FIG. 2 is a side elevation view of the bed of the pickup truck in the extended position.

Turning to FIGS. 1 and 2, therein is shown the present invention 10 being an extendable bed 12 of a pickup truck generally shown at 14 wherein the pickup truck has a front portion 16 containing the engine compartment 18 along with a cab portion 20 having a rear cargo bed 12 located behind the cab in the conventional manner wherein the bed has a floor portion 22 and a tail gate portion 24 wherein the tail gate portion is moveable from a substantially vertical upright position 26 to a substantially horizontal lower or open position 28. The bed 12 of the pickup truck 14 has left and right side panels generally indicated by reference numeral 30L and 30R. An operator 32 would operate the truck 14 in the conventional manner from the cab 20 of the truck 14. Wheels 34 are also shown placed on the front and rear portion of the truck 14 in the conventional manner. Tail lights 36L, 36R are also shown disposed on the rear end portions of the side panels 30L, 30R of the pickup truck 14 as would be done in the standard manner by one skilled in the art. Also shown underneath the floor 22 of the truck 14 is a hydraulic motor 38 for driving a hydraulic pump 39 which is fluidly connected by hydraulic lines 40 to left and right hydraulic cylinders 42L, 42R and having connecting rods 44L, 44R having connecting means 46L, 46R so that the hydraulic cylinders can be connected to a slidable rail portion 48L, 48R which is adapted to being extended from a fixed rail portion 50L, 50R which are fixedly attached to or a part of the frame (see FIG. 6, item 49) of the pickup truck 14 and mounted under the floor 22 of the bed 12 of the pickup truck 14 so that the extendable bed portion 10 can be extended from underneath the floor 22 of the truck 14 by having the operator 32 actuate an electrical switch 72 (see FIG. 9) from inside the cab 20 of the truck so that the extendable bed portion 10 will automatically extend from the bed 12 of the pickup truck 14. The tail lights 36L, 36R are built into the extendable portion 10 on the right and left sides of the tail gate portion 24 which extends from the bed 12 of the pickup truck so that when the tail gate portion extends the tail lights 36L, 36R extend with it.

Figure 3:
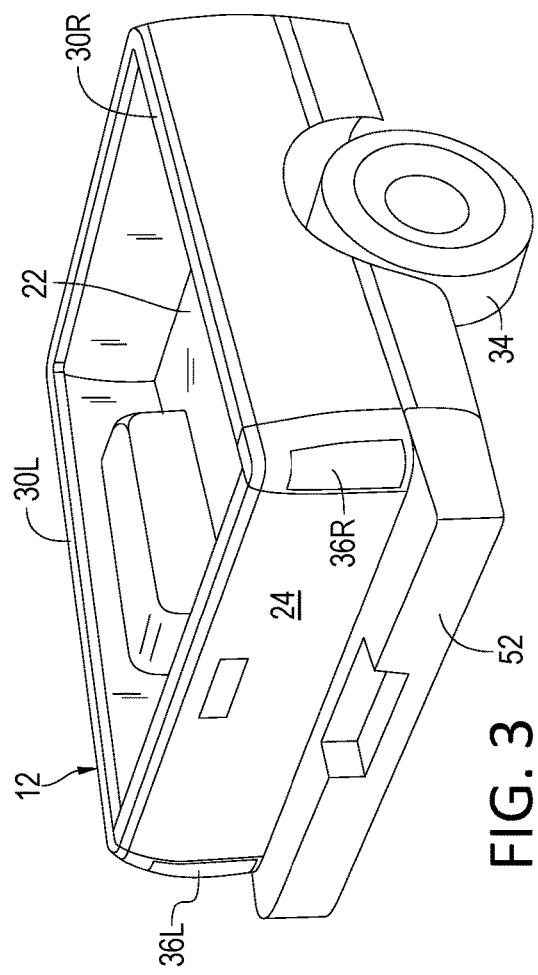
FIG. 3 is a perspective view of the bed of the pickup bed in the retracted position.

Turning to FIG. 3, therein is shown the bed 12 of the pickup truck 14 in a retracted position showing the left and right side panels 30L, 30R along with the floor 22 of the pickup bed including the tail gate 24 and the left and right tail lights 36L, 36R. Also shown is the rear wheel 34 of the pickup bed 12 along with a rear bumper 52 of the bed 12. The retracted position of FIG. 3 is the default position.

Figure 4:
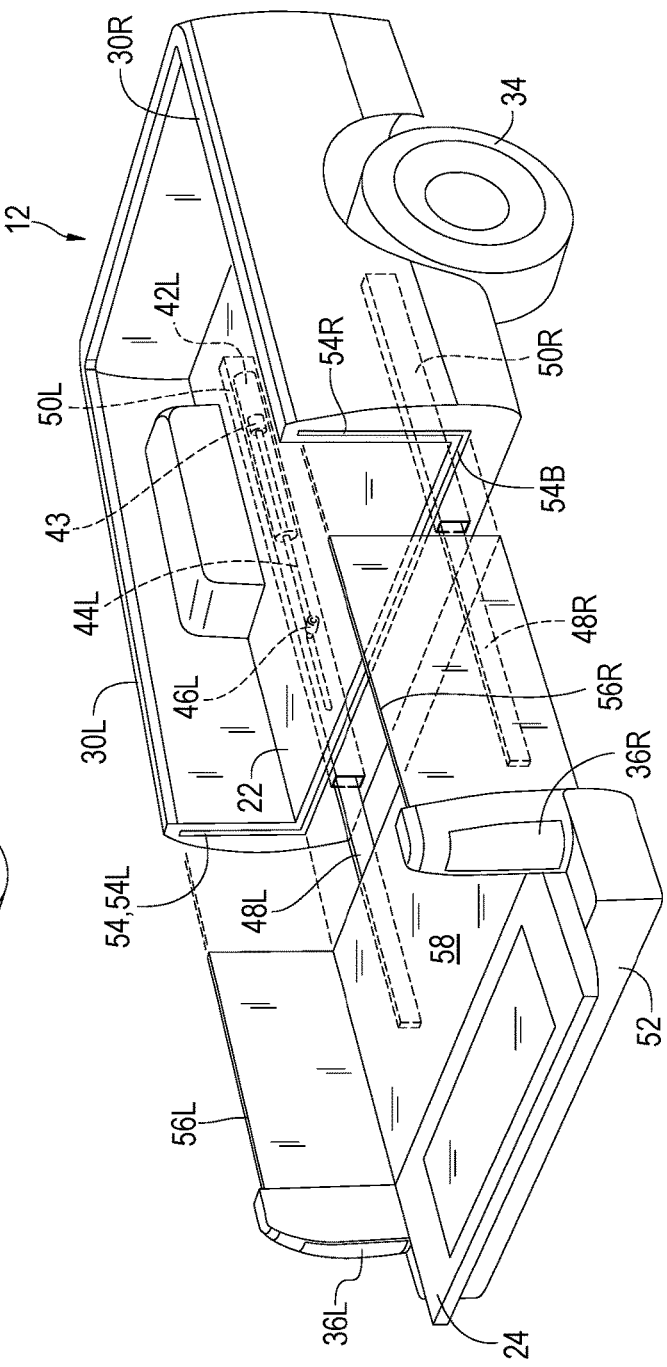
FIG. 4 is a perspective view of the bed of the pickup bed in an extended position.

Turning to FIG. 4, therein are shown previously disclosed elements of the present invention 10 along with the extendable floor 22 slides out of a pocket portion 54 having a left and right pocket portion 54L, 54R along with a bottom pocket portion 54B so that the left and right side panels extensions 56L, 56R are shown along with floor extension 58, all of which are carried in the pocket 54 when in the retracted position, but all of which are visible when in the extended position and also showing the tail gate 24 shown in the lowered position 28. Piston 43 inside the hydraulic cylinder 42L is also shown. Other previously disclosed elements may also be shown.

Turning to FIG. 5, therein are shown previously disclosed elements of the present invention 10 including the left sliding rail 48L, left fixed rail 50L, left extension rod 44L, left connector 46L, along with a slot 60 through which the connector 46L and connecting link 66 extend so that the left connector 46L can be connected to the left sliding rail 48L inside the left fixed rail 50L, along with a plurality of rollers 62 disposed inside the left fixed rail 50L underneath the left sliding rail upon which it can roll as the sliding rail moves back and forth inside the fixed rail. Floor 22 is also shown.

Turning to FIGS. 6-8, therein are shown cross-sectional views of the details of the previously disclosed elements of the present invention 10. Frame member 49 is also illustrated in FIG. 6. It can be seen that the roller 62 extends across the inside of the left fixed rail 50L so as to provide a support for the sliding 48L. The roller 62 also has an axle 64. FIG. 8 shows the floor extension 58 slidably disposed in the bottom pocket 54B as would be done in the standard manner by one skilled in the art. Similarly, the left and right panel extensions 56L, 56R would slide in/out or cooperate with their corresponding pockets 54, 54L, 54R similarly to how a conventional sliding pocket door operates as would be done in the standard manner by one skilled in the art.

In this specification, the frame as illustrated at 49, is the main supporting structure of the pickup truck 14 to which the other components are attached being somewhat comparable to a skeleton of an organism. Many years ago, most vehicles used a structural frame, separate from its body, and this type construction was commonly called a body on frame construction. However, as vehicle design evolved, many vehicles now use a unibody type construction meaning the frame and body have been integrated into one another. Many trucks and pickups continue to use a separate frame. In this specification, the frame or frame member is defined as any structure capable of supporting the vehicle's mechanical components and body and deal with static and dynamic loads, without undue deflection or distortion. This could include the frame member illustrated at 49 or the bed floor 22 or other components as would be done in the standard manner by one skilled in the art.

Turning to FIG. 9, therein is shown an illustrative schematic diagram of an electrical harness 68 including a battery 70 which could be the main battery of the vehicle 14 are an alternative battery, the electric motor 38, along with an actuating on/off switch 72 which could be placed in the cab 20 or elsewhere of the pickup truck for easy access by the operator 32. Additionally, the switch 72 could be operated remotely by the key fob for the vehicle as would be done in the standard manner by one skilled in the art.

Left and right side designations regarding the present invention 10 are interpreted from the view of one seated in the cab 20 facing forwardly, i.e., toward the front 16 of the truck 14.

By way of summary the present invention 10 may be described by making reference to FIGS. 1-9 as a method of constructing and using a pickup truck 14 with extendable bed 12, comprising the steps of: a) providing a cargo bed 12 extending rearwardly from a cab 20 of the pickup truck, the cargo bed having a fixed floor 22 and fixed left and right side upwardly extending panels 30L, 30R; b) providing a tail gate assembly movably mounted on rear ends of the fixed floor and fixed left and right side panels, the tail gate assembly comprising rear end portions of the side panels, a tail gate 24 portion moveable from a substantially vertical upright position to a substantially horizontal open position, and tail lights 36L, 36R mounted in the rear end portions of the side panels; the tail gate assembly also having a retractable floor 58 extending into a rear end of the fixed floor, and retractable left and right side panels 56L, 56R extending into rear ends of the fixed left and right side panels, a default position of the tail gate assembly being flush against the rear ends of the fixed floor and fixed left and right panels; c) using a switch 72 for actuating a means (may include 38, 39, 40, 42L, 42R, 44L, 44R, 46L, 46R or the like) for moving the tail gate assembly rearwardly from the default position to extend the floor and side panels of the pickup truck for enlarging cargo space on the pickup truck; and d) using the switch to actuate the means for retracting the tail gate assembly forwardly to the default position. Also, in which the tail gate assembly is supported on a pair of left and right sliding rails 48L, 48R which extend from left and right fixed rails SOL, 50R attached to a frame member 49 or possibly 22 or the like of the pickup truck. Further, in which the left and right sliding rails ride on rollers 62 within the left and right fixed rails; in which the left and right sliding rails are driven by a hydraulic cylinder 42L, 42R mounted under the fixed bed. Further, in which the hydraulic cylinder is powered by a pump 39 driven by an electric motor 38 and in which the electric motor is actuated by a switch inside of the cab. Further, in which the sliding and fixed rails are rectangular in cross-section (see FIG. 6), with the fixed rails being hollow to receive the sliding rails, the rollers being supported on axles 64 extending between side walls of the fixed rails, the fixed rails each having a slot 60 extending along a length thereof for accommodating linkage 66 to a piston 43 in the hydraulic cylinder actuated by the hydraulic pump.

I claim:

1. A pickup truck with extendable bed, comprising:
   a) a cargo bed extending rearwardly from a cab of said pickup truck;
   b) said cargo bed having a fixed floor and fixed left and right side upwardly extending panels;
   c) a tail gate assembly movably mounted on rear ends of said fixed floor and fixed left and right side panels, said tail gate assembly comprising rear end portions of said side panels, a tail gate portion moveable from a substantially vertical upright position to a substantially horizontal open position, and tail lights mounted in said rear end portions of said side panels;
   d) said tail gate assembly also having a retractable floor extending into a rea and of said fixed floor, and retractable left and right side panels extending into and through rear end openings into said fixed left and right side panels, a default position of said tailgate assembly being flush against said rear ends of said fixed floor and fixed left and right panels;
   e) means for moving said tail gate assembly rearwardly from said default position for extending said floor and side panels of said pickup truck for enlarging cargo space on said pickup truck and retracting said tail gate assembly forwardly to said default position;
   f) a rear bumper, left and right tail light assemblies attached to said retractable floor so that movement of said tail gate assembly rearwardly to enlarge the cargo space also moves said rear bumper and tail light assemblies rearwardly;
   g) wherein said tail gate assembly is supported on a pair of left and right sliding rails which extend from left and right fixed rails attached to a frame member of said pickup truck; and
   h) wherein said left and right sliding rails ride on rollers within said left and right fixed rails.

2. The pickup tuck of claim 1, in which moving means is actuated remotely by a user.

3. The pickup truck of claim 1, in which said left and right sliding rails are each driven by a hydraulic cylinder mounted under said fixed bed.

4. A method of constructing and using a pickup truck with extendable bed, comprising the steps of:
   a) providing a cargo bed extending rearwardly from a cab of the pickup truck, the cargo bed having a fixed floor and fixed left and right side upwardly extending panels;
   b) providing a tail gate assembly movably mounted on rear ends of the fixed floor and fixed left and right side panels, the tail gate assembly comprising rear portions of the side panels, a tail gate portion moveable from a substantially vertical upright position to a substantially horizontal open position, and tail lights mounted in the rear and portions of the side panels; the tail gate assembly also having a retractable floor extending into a rear end of the fixed floor, and retractable left and right side panels extending into rear openings to the fixed left and right side panels, a default position of the tail gate assembly being flush against the rear ends of the fixed floor and fixed left and right panels;
   c) using a switch for actuating a mean for moving the tail gate assembly rearwardly from the default position to extend the floor and side panels of the pickup truck for enlarging cargo space on the pickup truck;
   d) using the switch to actuate the means for retracting the tailgate assembly forwardly to the default position;
   e) attaching a rear bumper, left and right tail light assemblies of said truck to said retractable floor so that movement of said tail gate assembly rearwardly to enlarge the cargo space also moves said rear bumper and tail light assemblies rearwardly;
   f) in which the tail ante assembly is supported on a pair of left and right sliding rails which extend from left and right fixed rails attached to a frame member of the pickup truck; and
   g) in which the left and right sliding rails ride on rollers within the left and right fixed rails.

5. The method of claim 4, in which the left and right sliding rails are driven by a hydraulic cylinder mounted under the fixed bed.

6. A pickup truck with extendable bed, comprising:
   a) a cargo bed tending rearwardly from a cab of said pickup truck;
   b) said cargo bed having a fixed floor and fixed left and right side upwardly extending panels;

c) a tail gate assembly movably mounted on rear ends of said fixed floor and fixed left and right side panels, said tailgate assembly comprising rear end portions of said side panels, a tail gate portion moveable from a substantially vertical upright position to a substantially horizontal open position, and tail lights mounted in said rear end portions of said side panels;

d) said tail gate assembly also having a retractable floor extending into a rear end of said fixed floor, and retractable left and right side panels extending into rear ends of said fixed left and right side panels, default position of said tail gate assembly being flush against said rear ends of said fixed floor and fixed left and right panels;

e) means remotely actuated by a user for moving said tail gate assembly rearwardly from said default position for extending said floor and side panels of said pickup tuck for enlarging cargo space on said pickup truck and retracting said tail gate assembly forwardly to said default position;

f) said tan gate assembly being supported on a pair of left and right sliding rails which extend from left ad right fixed rails attached to a frame member of said pickup truck, said left and right sliding rails riding on rollers within said left and right fixed rails; and g) said left and right sliding rails being each driven by a hydraulic cylinder mounted under said fixed bed.

7. The pickup truck of claim 6, in which said hydraulic cylinder is powered by a pump driven by an electric motor.

8. The pickup truck of claim 7, in which said electric motor is actuated by a switch inside of said cab.

9. A pickup truck of claim 7, in which said sliding and fixed rails are rectangular in cross-section, with said fixed rails being hollow to receive said sliding rails, said rollers being supported on axles extending between side walls of said fixed rails, said fixed rails each having a slot extending along a length thereof for accommodating linkage to a piston in said hydraulic cylinder actuated by said hydraulic pump.

10. A method of constructing and using a pickup truck with extendable bed, comprising the steps of:

a) providing a cargo bed extending rearwardly from a cab of the pickup truck, the cargo bed having a fixed floor and fixed left and right side upwardly extending panels;

b) providing a tail gate assembly movably mounted on rear ends of the fixed floor and fixed left and right side panels, the tail gate assembly comprising rear end portions of the side panels, a tail gate portion moveable from a substantially vertical upright position to a substantially horizontal open position, and tail lights mounted in the rear end portions of the side panels; the tail gate assembly also having a retractable floor extending into a rear and of the fixed floor, and retractable left and right side panels extending into rear ends of the fixed left and right side panels, a default position of the tail gate assembly being flush against the rear ends of the fixed floor and fixed left and right panels;

c) using a switch for actuating a means for moving the tail gate assembly rearwardly from the default position to extend the floor and side panels of the pickup truck for enlarging cargo space on the pickup truck;

d) using the switch to actuate the means for retracting the tail gate assembly forwardly to the default position;

e) supporting the tail gate assembly on a pair of left and right sliding mils which extend from left and right fixed rails attached to a frame member of the pickup truck, said left and right siding rails riding on rollers within the left and right fixed rails; and f) using a hydraulic cylinder under the fixed bed to drive the left and right sliding rails.

11. The method of claim 10, in which the hydraulic cylinder is powered by a pump driven by an electric motor.

12. The method of claim 11, in which the electric motor is actuated by a switch inside of the cab.

13. The method of claim 12, in which the sliding and fixed rails are rectangular in cross-section, with the fixed rails being hollow to receive the sliding rails, the rollers being supported on axles extending between side walls of the fixed rails, the fixed rails each having a slot extending along a length thereof for accommodating linkage to a piston in the hydraulic cylinder actuated by the hydraulic pump.

* * * * *